MAGNETIC MEMORY HAVING PLURAL DOMAIN WALL POSITIONS PER BIT

Filed Sept. 16, 1966 3 Sheets-Sheet 1

INVENTOR
H. E. D. SCOVIL
BY Herbert M. Shapiro
ATTORNEY

United States Patent Office 3,471,841
Patented Oct. 7, 1969

3,471,841
MAGNETIC MEMORY HAVING PLURAL DOMAIN WALL POSITIONS PER BIT

Henry E. D. Scovil, New Vernon, N.J., assignor to Bell Telephone Laboratories, Incorporated, Murray Hill and Berkeley Heights, N.J., a corporation of New York Filed Sept. 16, 1966, Ser. No. 579,902
Int. Cl. G11b 5/62
U.S. Cl. 340—174 6 Claims

ABSTRACT OF THE DISCLOSURE

Low accessing costs for small capacity memories are achieved by an organization of domain propagation character recognizers which utilize common accessing circuits to advance permanently stored domain walls selectively for detection.

This invention relates to information stores and, more particularly, to memory and accessing arrangements for such stores.

Accessing circuits for magnetic memories constitute a significant portion of the cost of such memories. For large bit capacity memories the cost of the accessing on a per-bit basis is low. Unfortunately, for low capacity memories, the cost of accessing is distributed over fewer bits and, consequently, is prohibitively high. In fact, the cost of accessing is so high that small capacity memories cost essentially the same as much larger capacity memories. As a result, a significant demand for low capacity memories at competitive prices is unsatisfied.

Accordingly, it is one object of this invention to provide a new and novel memory-accessing arrangement.

The invention is based, to a large extent, on the realization that a reversed magnetized domain may be stored in each bit location of a matrix of bit locations in a magnetic storage and propagation medium and that a wall of that domain may be moved selectively by a sequence of $1 \leq i \leq n$ coded pulses to any of $n$ positions in each bit location. Accordingly, a memory is constructed of such a medium where the presence or absence of a domain wall in the $n$th position of a selected bit location is indicative of binary one or binary zero information states respectively. Such an arrangement permits the adaptation of, for example, spatially distributed binary coded drive conductors for determining the positions of domain walls of reverse magnetized domains in a matrix of bit locations providing a memory which is, at the same time, essentially its own accessing circuit. Fewer drive conductors and fewer drivers are required for that accessing. And, in addition, such an arrangement is attractive because of competitively low drive requirements and very high signal-to-noise ratios exhibited thereby.

A feature of this invention is a magnetic memory arrangement comprising a magnetic medium, means defining in the medium a matrix of bit locations each including first and $n$th positions, each first position normally including a domain wall of a reverse magnetized domain, and means including a plurality of spatially distributed coded drive conductors coupled to next adjacent segments of the medium between first and $n$th positions of each bit location for moving domain walls to $n$th positions in selected bit locations when pulsed in sequence.

The foregoing and further objects and features of this invention will be more fully understood from a consideration of the following detailed description rendered in conjunction with the accompanying drawing, in which:

FIG. 1 shows an illustrative sixteen-bit location memory arrangement 10 in accordance with one aspect of this invention. The memory arrangement comprises a plurality of domain wall wires DW1, DW2, DW3, and DW4.

A plurality of addressing conductors A1, A2, A3, and A4 couple different sections of the domain wall wires in a coded manner. The addressing conductors are connected between an addressing circuit 11 and ground. The illustrative coded manner of coupling between the addressing conductors and the domain wall wires is consistent with the conventional binary code shown, for example, in Patent No. 2,920,317 issued Jan. 5, 1960, to P. Mallery, arranged for bipolar drive pulses. Conventional mirror symbols are used in FIG. 1 to represent the coded couplings, the diagonal lines at intersections between a domain wall wire and an addressing conductor being oriented such that a positive pulse in the addressing conductor provides a field for moving a domain wall past the conductor in the direction of light reflected from a mirror oriented as is the diagonal line.

Lock conductors LL and LR couple the different sections of the domain wall wires in like senses and sandwich the addressing conductors therebetween at each section. The lock conductors LL and LR function to lock a domain wall to the left and to the right, respectively, as will become clearer hereinafter. The lock conductors are connected between a lock pulse source 12 and ground.

Figure 1:
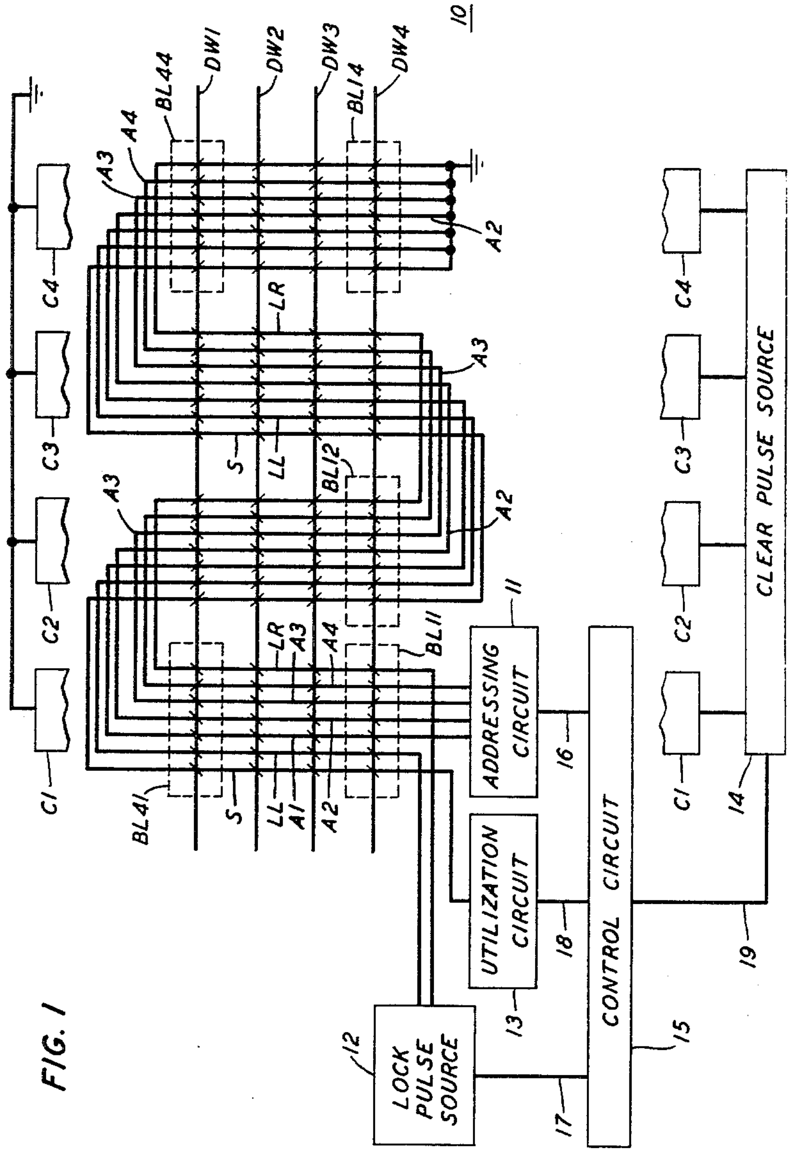
FIG. 1 is a schematic illustration of a memory and accessing arrangement in accordance with this invention.
Figure 2:
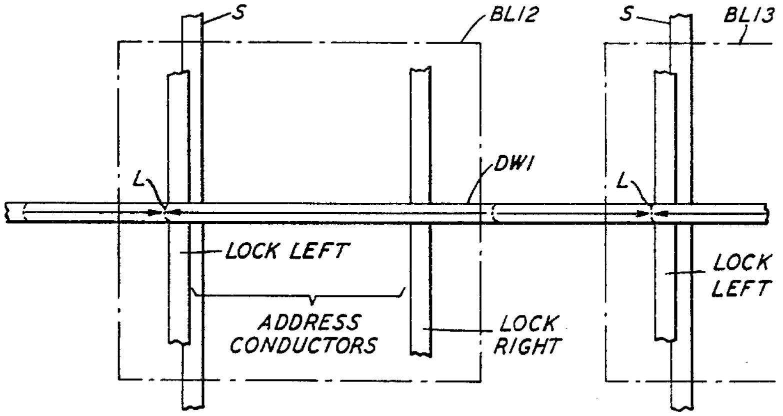
FIG. 2 is a schematic illustration of a basic cell of the arrangement of FIG. 1.

A sense conductor S couples different sections of the domain wall wires also in like senses and is positioned next adjacent the lock-left conductor LL as shown in FIG. 2 although shown schematically to the left thereof in FIG. 1. Sense conductor S is connected between a utilization circuit 13 and ground.

Each of a plurality of clear solenoids C1, C2, C3, and C4 wraps about the entire array of bit locations in a column and is connected between a clear pulse source 14 and ground. The clear solenoids are represented by broken solenoid indications below and above the array as shown in FIG. 1. Such solenoid indications are assumed to represent solenoids wrapped about the array and connected to generate a substantially uniform negative (−) field to the left as viewed at each bit location when pulsed in parallel.

Addressing circuit 11, lock pulse source 12, utilization circuit 13, and clear pulse source 14 are connected to a control circuit 15 by means of conductors 16, 17, 18, and 19 respectively. The various circuits and pulse sources may be any such elements capable of operating in accordance with this invention.

Each section of each domain wall wire, then, is coupled by addressing conductors, lock conductors, and a sense conductor. Those conductors define a bit location at each section. The bit locations are designated by broken block symbols designated BL11 . . ., BL14 . . ., and BL44 in FIG. 1. The fields provided by the defining conductors in each bit location function as do domain wall propagation fields. Each bit location, then, has a coded set of propagation fields associated with it such that a bit location is "selected" when the associated coded set of fields is generated by current pulses applied to the conductors defining the bit locations.

It is helpful to visualize a reverse magnetized domain stored permanently next adjacent a lock-left conductor at each bit location. A coded set of fields operates to move a wall of one of those domains to the position of the lock-right conductor at the selected bit location. Domain walls of domains stored at other bit locations, of course, are moved to intermediate positions by the addressing fields and are cleared from those positions at the termination of each write operation.

A coded set of currents on the conductors defining the bit locations may be represented by a coded set of positive and negative signs, a current flowing from a pulse source being represented by a positive sign, and a current flowing toward a pulse source being represented by a negative sign. Each set of currents is transformed into a corresponding set of magnetic fields in accordance with the address (coupling) configuration of each bit location. For each set of currents positive (+) magnetic fields are generated, illustratively in sequence, throughout only one bit location for moving a domain wall to the lock-right position. In other bit locations domain walls are moved to intermediate positions and returned to initial positions during a write operation. A domain wall in the initial position may be assumed to represent a binary "zero"; a domain wall in the lock-right position may be assumed to represent a binary "one," as is described more fully hereinafter. Importantly, a pulse in an addressing or lock conductor generates a field for advancing a wall past the pulsed conductor and does not generate a field which couples walls spaced apart one conductor from the pulsed conductor.

Each conductor defining the bit location and also the clear solenoid may include a positive or a negative current pulse (or no pulse at all). These alternatives may be represented by plus and minus signs respectively. Consider a representative coded set of currents plus, minus, plus, minus (+ − + −) applied in sequence to spatially distributed address conductors (solenoids) A1, A2, A3, and A4, respectively, via addressing circuit 11 under the control of control circuit 13. Table I shows the field representations for each bit location in the memory in response to that current code.

TABLE I

| BL | 0 | 1 | 2 | 3 | 4 | 5 | 6 |
|---|---|---|---|---|---|---|---|
| 11 | | + | + | − | − | − | + |
| 21 | | + | + | − | − | + | + |
| 31 | | + | + | − | + | − | + |
| 41 | | + | + | − | + | + | + |
| 42 | | + | + | + | − | − | + |
| 32 | | + | + | + | − | + | + |
| 22 | | + | + | + | + | − | + |
| 12 | | + | + | + | + | + | + |
| 13 | | + | − | − | − | − | + |
| 23 | | + | − | − | − | + | + |
| 33 | | + | − | − | + | − | + |
| 43 | | + | − | − | + | + | + |
| 44 | | + | − | + | − | − | + |
| 34 | | + | − | + | − | + | + |
| 24 | | + | − | + | + | − | + |
| 14 | | + | − | + | + | + | + |
| | | Lock-left | Address Conductors | | | | Lock-right |

It is to be remembered that address conductors A1, A2, A3, and A4 are pulsed, illustratively, in sequence. Only in bit location BL12 are the sequentially generated addressing fields all positive. It is clear, then, that only a reverse magnetized domain having a (leading) domain wall in a position to be influenced by a sequence of plus fields generated by the illustrative sequence of currents, plus, minus, plus, minus, in the address conductors are advanced.

Each bit location normally includes a leading domain wall of a reverse domain stored initially in a position in a domain wall wire corresponding to the line separating the 0 and 1 columns in Table I. This position for the domain wall is shown for a representative bit location BL12 in FIG. 2. The leading wall (boundary) L of the reverse domain is in a position to be influenced by a positive (+) field generated by a positive current pulse in the lock-left conductor LL of FIG. 1. A write operation accordingly is initiated by a positive pulse in the lock-left conductor advancing the leading domain wall in each bit location to a position at which it is influenced by the addressing fields. That position is designated 1 in Table I, the leading wall being in a position corresponding to the right edge of the 1 position as viewed in the table.

Succeeding positions for a domain wall in a segment of the magnetic wires of the figure corresponding to the address conductors A1, A2, A3, and A4 are designated 2, 3, 4, and 5 in Table I. A leading domain wall passes each position if a positive (+) field is appropriately generated. A glance at Table I shows that the wall in bit location BL12 is the only wall advanced to the right of position 5 as viewed in the table. Walls in other bit locations are stopped at positions where negative (−) fields are generated. For example, a leading wall in bit location BL24 is stopped to tthe right of the 1 position.

Figure 4:
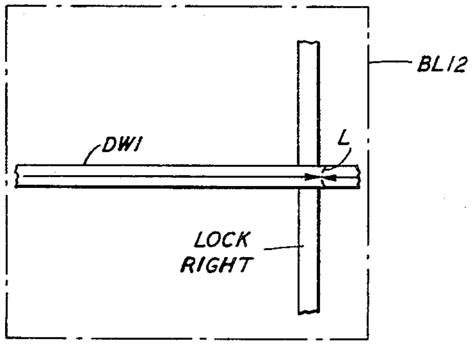

A positive pulse (+) applied thereafter to the lock-right conductor advances the leading domain wall in only bit location BL12 to the right of the 6 position because only the domain wall in that bit location is in a position influenced by the field generated by the pulse in the lock-right conductor. The leading domain wall L is shown in the corresponding 6 position in FIG. 4.

A domain wall in the 6(*n*th) position is considered to represent a binary one for the present illustration. After a binary one is stored, the clear solenoids are pulsed for generating fields to return to 1 positions the domain walls in all nonselected bit locations where those walls are located in the 1 through 5 positions.

All pulses are applied to the addressing, lock, and clear lines via addressing circuit 11, and sources 12 and 14, respectively, under the control of control circuit 15.

Binary ones are stored in other bit locations similarly. Each time a binary one is stored, however, a pulse is applied to the clear solenoids C1, . . ., and C4 by means of pulse source 14 under the control of control circuit 15. It is important to note that that clear pulse returns domain walls to lock-left (1) positions in all but the selected bit location and those locations including previously stored "ones." For example, a wall in bit location BL32 is to the right of the 3 position, as is clear from Table I, when a binary one is stored, as described, in bit location BL12. The clear pulse generates a field for returning such a wall to a lock-left position. The clear pulse is followed by a pulse on the lock-left conductor for returning walls in nonselected addresses to corresponding 0 positions. Table I indicates the position of the walls in nonselected locations in the memory, that is to say, those walls stop when they encounter a negative field. The clear pulse and the lock-left pulse, then, return all such walls to 0 positions. Illustratively, the clear solenoid couples only positions 2 through 5 and so does not effect a wall in a 6 position.

Stored ones are read from memory by similarly applying pulses to the address conductors to reverse the movement of information. Specificaly, a pulse code minus, plus, minus, plus (−+−+) applied to conductors A4, A3, A2, and A1 in sequence provides a sequence of negative fields to return a binary one stored in bit location BL12 to the zero position there. To this end, the lock-right conductor is pulsed negatively to move binary ones into positions influenced by the addressing fields. Disturbed "ones" are returned to the undisturbed (6) positions, at the termination of the addressing pulses, by appropriately pulsing (opposite polarity) the clear solenoids in a manner analogous to that described.

The sense conductors are arranged next adjacent the lock-left conductor to the right thereof as shown in FIG. 2. A pulse is induced in the sense conductor as a domain wall passes therebeneath into a 1 position. The lock-left conductor is then pulsed negatively to return the wall to the 0 position. Readout is destructive, illustratively. It is clear, however, that operation could be on a read-restore basis.

As described, the lock-left and lock-right conductors are necessary to insure that domain walls are stored in positions uninfluenced by addressing fields except when desired.

Figure 5:
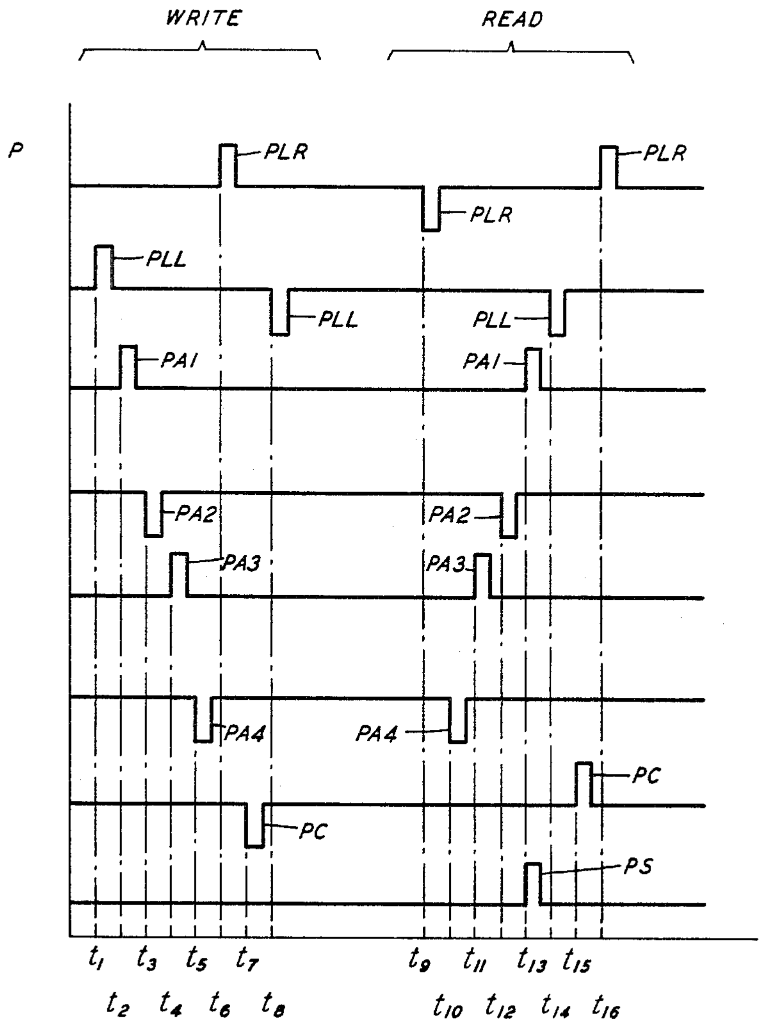
FIG. 5 is a pulse diagram of the operation of the arrangement of FIG. 1.

FIG. 5 is a pulse diagram of the operation of the arrangement of FIG. 1. For a write one operation, the lock-left conductor is pulsed as indicated by the pulse form PLL in FIG. 5. Then the pulse code plus, minus, plus, minus is applied to conductors A1, A2, A3, and A4, illustratively, in sequence as shown by pulse forms PA1, PA2, PA3, and PA4, respectively, at times *t2*, *t3*, *t4*, and *t5* in FIG. 5. At time *t6*, the lock-right conductor is pulsed as indicated by pulse PLR in FIG. 5. A binary one is now stored in position 6 in bit location BL12 as indicated in Table I and shown in FIG. 4. At time *t7*, a pulse is applied to the clear solenoids to return walls in nonselected locations to corresponding 1 positions. This is indicated by the pulse PC in FIG. 5. The clear pulse is followed by a lock-left pulse PLL at time *t8*.

Figure 3:
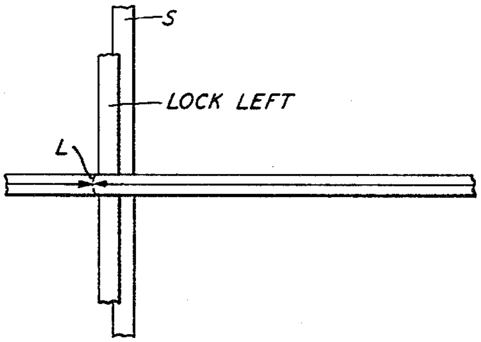
FIGS. 3 and 4 are illustrations of portions of the cell of FIG. 2 showing magnetic conditions thereof during operation.

For a read operation, the lock-right conductor is pulsed (negatively) as indicated by the pulse form PLR at time *t9* in FIG. 5. Thereafter, the pulses minus, plus, minus, plus are applied to conductors A4, A3, A2, and A1 as indicated by the pulses PA4, PA3, PA2, and PA1 in FIG. 5, at times *t*10, *t*11, *t*12, and *t*13 respectively, for returning the domain wall in bit location P12 to the 1 position there. In this manner a pulse PS is induced in conductor S coupled to the bit locations in the corresponding position as also shown in FIG. 3, under the control of control circuit 15. The pulse PS is shown in FIG. 5 also at time *t*13.

At time *t*/14 in FIG. 5 the lock-left conductor is pulsed negatively (for destructive read) returning the wall in the selected location to the 0 position. Thereafter, at time *t*15 in FIG. 5, the clear solenoids are pulses as indicated by the pulse PC to return disturbed (binary) ones to corresponding lock-right positions. A pulse PLR applied to the lock-right conductor at time *t*16 returns such walls to corresponding 6 positions. The pulses shown in FIG. 5 are intended to be only representative of the pulse sequences applied. The various amplitudes and durations of such pulses would be clear to one skilled in the art.

The memory of FIG. 1 may be visualized as including a matrix of bit locations each comprising a sequence detector or recognizer. The drive conductors are spatially distributed coupling next adjacent positions along the magnetic wire at each bit location. Only at that bit location corresponding to the selected input code does a domain wall pass to a stored one position. The advantage is that all the bit locations may be wired in a consistent manner to insure selectivity, yet the number of conductors and drivers is relatively low. This may be illustrated by a comparison between the drive requirements for an ideal $2^n$ bit memory. Conventional accessing employs $$2\left[2^{\frac{n}{2}}\right]$$

drivers and drive conductors. In accordance with this invention only *n* drivers are employed. If $2^n=8000$, $n=13$, and $$2\left[2^{\frac{n}{2}}\right]=\text{about } 90$$

A further advantage of a memory in accordance with this invention is that competitively low currents are required to generate suitable fields to move domain walls particularly when compared to the currents required for switching flux in a defined area of the memory. Specifically, domains are moved or expanded from a 1 to an *n* position by drives on the order of an ampere turn. Moreover, a memory in accordance with this invention exhibits a very large signal-to-noise ratio because a domain wall in the selected location passes the sense conductor at a time when the walls in a nonselected location do not pass that conductor. Thus an output pulse is observed at a time other than that at which the noise is observed. In addition, a slight displacement of the sense conductor with respect to the various conductors (i.e., the lock-left conductor) permits a domain wall to pass the sense conductor at a time different from the time of the leading edge of the "interrogating" drive pulse substantially eliminating a further cause of noise.

For the foregoing description, a reverse domain was assumed to be of a prescribed magnetization. It should be understood that the opposite magnetization direction could have been assumed for a reverse domain. In the latter case, of course, the coded couplings of the conductors defining the bit locations are reversed. An entire reverse domain may be propagated rather than a single wall, then, if, for example bit locations are defined by two sets of oppositely coded conductors for advancing both leading and trailing walls of the domain. Corresponding conductors of the two sets of coded conductors may be interconnected in a manner consistent with that described for moving domains in K. D. Broadbent, Patent No. 2,919,432, issued Dec. 29, 1959.

The particular code employed need not be arranged for advancing (domains or) domain walls by means of positive and negative pulses as described. Alternatively, two sets of addressing conductors may be coupled to different bit locations achieving selectivity by the provision of like polarity pulses on a selected set of addressing conductors.

In arrangements in accordance with this invention employing codes where both positive and negative pulses are used for either write or read operations, domain walls already in binary one or binary zero positions may be disturbed unless lock conductors are present for retaining such walls undisturbed as described. In arrangements coded such that only positive pulses advance domain walls (or domains), movement of such walls is possible only in one direction at a time and stored information is not so disturbed. In such arrangements, the lock conductors are unnecessary.

The invention has been described in terms of an illustrative binary code. It is to be understood, however, that other well known codes may be employed alternatively. Regardless of the code employed, as the number *n* of positions in a bit location increases, pretranslation circuitry, characteristic of prior art arrangements, is simplified or eliminated.

It is contemplated that a reverse magnetized domain be stored permanently in each bit location (see FIG. 2) in a memory arrangement in accordance with this invention, information states being represented, in one aspect thereof, by the position of the domain wall of the domain in a selected position in each bit location. Caution dictates the provision of an initializing means for rewriting ones of such domains which may be erased accidentally. To this end, a write conductor, not shown, may be coupled to each bit location for providing reverse domains in positions shown in FIG. 3 when pulsed. Such an implementation is well known. Any appropriately placed field-providing means would be suitable.

Although memories in accordance with this invention are particularly economical when small bit capacities are desired, the memories are also useful for large capacity arrangements. Specifically, when the number *n* of positions in a bit location is made equal to some small number such as, for example, four, only four spatially distributed addressing conductors need be used. Such conductors may be organized, for example, in the well known 2–D or 3–D arrangements. As *n* is reduced, of course, the external circuitry increases in complexity and cost. In such large capacity memories, however, relatively expensive external electronics may be tolerated. The large capacity memories are conveniently operated in the absence of lock conductors as indicated above. One such memory is described in copending application Ser. No. 579,904, filed Sept. 16, 1966, for A. H. Bobeck. Copending application Ser. No. 579,905, filed Sept. 16, 1966, for A. H. Bobeck also describes such memories and their use in crosspoint arrangements.

Memory arrangements in accordance with this invention may be fabricated of magnetic wire in which reverse magnetized domains are nucleated, in a magnetically initialized wire, in response to a field in excess of a nucleation threshold in a limited portion of the wire and in which reverse domains are moved through the wire in response to step-along fields less than the nucleation threshold but in excess of a propagation threshold. For wire arrangements, the drive conductors may comprise a woof woven into a warp comprising the magnetic wires. Alternatively, magnetic sheets may be employed. Suitable magnetic sheets are described in copending applications Ser. No. 579,995, filed Sept. 16, 1966, for P. C. Michaelis and Ser. No. 579,931, filed Sept. 16, 1966, for A. H. Bobeck, U. F. Gianola, R. C. Sherwood, and W. Shockley. If a sheet is used, simple printed circuit techniques are employed for providing drive conductors. Such conductors are coded conveniently by depositing each to couple a prescribed different set of bit locations, as described, and are driven by like polarity pulses.

What has been described is considered only illustrative of the principles of this invention. Accordingly, various and other arrangements may be devised by one skilled in the art without departing from the spirit and scope of this invention.

What is claimed is:

1. A combination comprising a magnetic medium capable of storing reverse magnetized domains having first domain walls, means for defining in said medium a matrix of bit locations each having first through *n*th possible positions for one of said walls, each first position normally including a domain wall, advance means responsive to a plurality of coded input signals for advancing said domain walls from said first to said *n*th positions in selected bit locations, means for returning domain walls only from the second through the $(n-1)$th positions to said first positions in all nonselected ones of said bit locations, and sense means for selectively interrogating said bit locations for sensing the presence of domain walls in *n*th positions.

2. A combination in accordance with claim 1 wherein said medium comprises a plurality of magnetic wires.

3. A combination in accordance with claim 2 wherein said advance means comprises a plurality of drive conductors coupled in a coded fashion to said magnetic wires at said bit locations.

4. A combination in accordance with claim 3 wherein said sense means comprises means selectively returning a domain wall in a selected wire to a first position there and a sense conductor coupled to said magnetic wires for selectively detecting the passage of domain walls from said *n*th to said first position.

5. An information storage circuit comprising a plurality of domain wall wires, means defining in said wires a plurality of bit locations having first through *n*th positions, each first position normally including a reverse magnetized domain having a first domain wall, means coupled to said wires in coded fashion for advancing said wall in a selected bit location to an *n*th position there, means retaining walls at said *n*th position in each of said bit locations, means returning to first positions walls in said bit locations at positions other than *n*th positions, and means selectively returning walls at said *n*th positions of said bit locations to corresponding first positions.

6. A combination including a propagation medium, means defining in said medium bit locations each including first and *n*th positions, each of said first positions normally including a magnetized boundary, means comprising a plurality of conductors coupled to said bit locations in a manner to move said boundaries to corresponding *n*th positions selectively when pulsed in sequence, means for returning domain walls from the second through the $(n-1)$th positions to said first positions in all nonselected ones of said bit locations, and sense means for selectively detecting the presence of boundaries in said *n*th positions.

References Cited

UNITED STATES PATENTS

| | | | |
|---|---|---|---|
| 3,090,946 | 5/1963 | Bobeck | 340—173 |
| 3,241,127 | 3/1966 | Snyder | 340—174 |
| 3,316,543 | 4/1967 | Tickle | 340—174 |

STANLEY M. URYNOWICZ, Jr., Primary Examiner